ly 6, 1975

United States Patent [19]
Serbent et al.

[11] 3,881,916
[45] May 6, 1975

[54] PROCESS FOR THE PRODUCTION OF SPONGE IRON

[75] Inventors: Harry Serbent, Schoneck; Wilhelm Thumm, Frankfurt am Main; Horst Nagel, Bergen-Enkheim, all of Germany

[73] Assignee: Metallgesellschaft Aktiengesellschaft, Frankfurt am Main, Germany

[22] Filed: Aug. 15, 1973

[21] Appl. No.: 388,353

[30] Foreign Application Priority Data
Aug. 22, 1973 Germany............................ 2241168

[52] U.S. Cl. .................................... 75/36; 266/18
[51] Int. Cl. .............................................. C21b 13/08
[58] Field of Search ............... 75/33, 34, 35, 36, 38; 266/18

[56] References Cited
UNITED STATES PATENTS
2,484,911  10/1949  Seil ........................................ 75/36

2,754,197  7/1956  Wienert ................................ 75/36
3,182,980  5/1965  Helfrich ............................ 75/34 X

*Primary Examiner*—L. DeWayne Rutledge
*Assistant Examiner*—M. J. Andrews
*Attorney, Agent, or Firm*—Karl F. Ross; Herbert Dubno

[57] ABSTRACT

Iron-oxide-containing materials (e.g. iron ores) are directly reduced in a rotary furnace to produce sponge iron, by using a solid carbon-containing reducing agent and oxygen-rich or other oxygen-containing gases. The oxygen-containing gases are injected into the furnace at one end thereof at a speed of at least 50 m/sec., substantially in the direction in which the furnace gases (combustion and combusting gases) flow through the furnace and approximately parallel to the longitudinal axis of the kiln. Nozzle blocks forming the wall of the furnace in the area of the end of the furnace at which the charge is introduced can be used for the injection of a part of the necessary amount of oxygen-containing gases.

12 Claims, 2 Drawing Figures

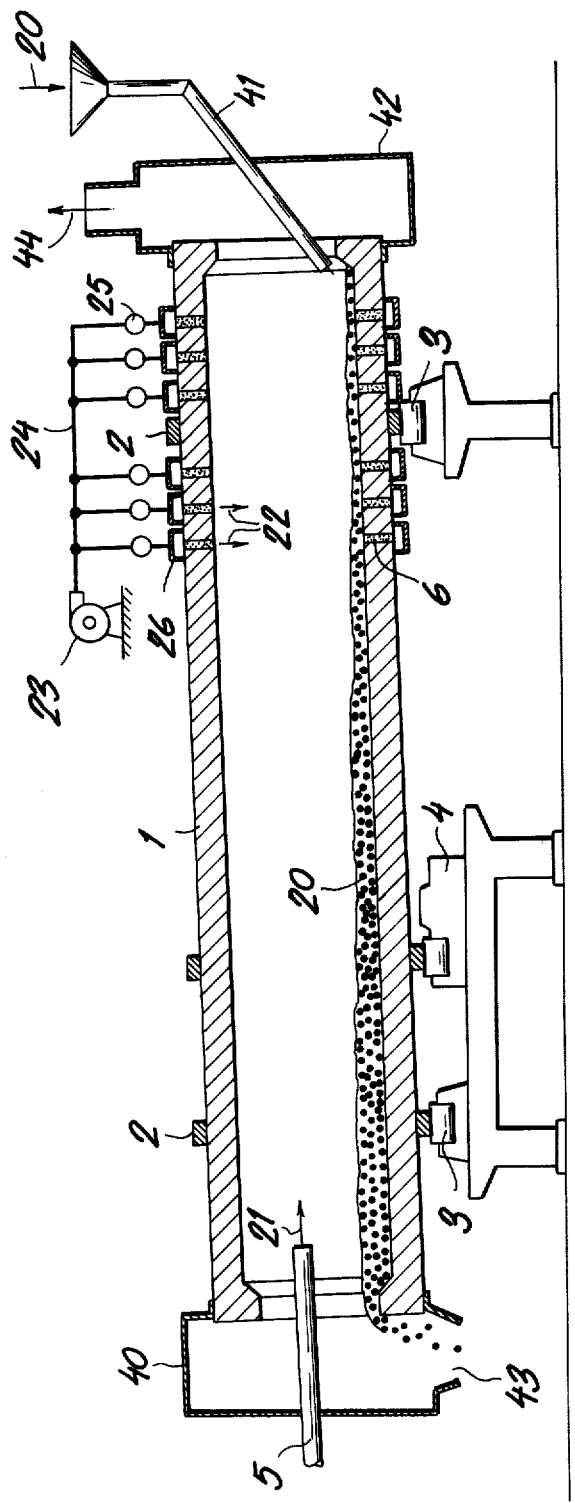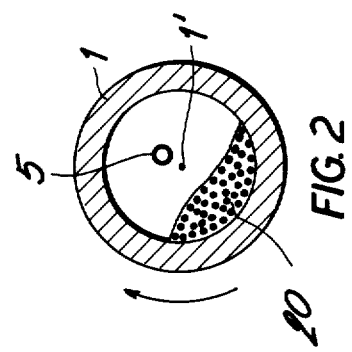
FIG.1
FIG.2

PROCESS FOR THE PRODUCTION OF SPONGE IRON

FIELD OF THE INVENTION

Our present invention relates to a process for the production of sponge iron by direct reduction of iron-oxide-containing materials in a rotary furnace using a solid carbon-containing reducing agent and oxygen-containing gases.

BACKGROUND OF THE INVENTION

When iron-oxide-containing materials are directly reduced to sponge iron, i.e., are reduced in a solid/gas system at a temperature below the softening- and melting-points of the charge constituents, without formation of a liquid or pasty phase, a rotary furnace may be used and the charge in the rotary kiln contains a solid reducing agent. A suitable reducing agent can be obtained by cracking liquid of carbonaceous materials, e.g., hydrocarbons. The requisite temperature is provided by direct heating of the rotary kiln by combustion of gas, oil, pulverized coal or by burning volatile components which are driven out of the carbonaceous materials in the rotary furnace. CO, formed in situ, also constitutes a heat source.

Satisfactory throughput performance in rotary kilns is achieved by heating the charge very quickly to the optimum reduction temperature and maintaining this charge temperature for the traveling charge in the reduction zone of the furnace for as long a time as possible. The optimum reduction temperature is a temperature slightly below the softening or melting points of that charge component which has the lowest softening or melting point. Such reduction temperatures generally are between 900° and 1,150°C.

It is known to control the temperature conditions in a rotary furnace by blowing controlled amounts of oxygen-containing gases necessary for complete combustion through shell tubes mounted in the wall of the furnace and extending inside the furnace, e.g., to the center thereof (Blast Furnace and Steel Plant, October 1962, pages 977–989; U.S. Pat. Nos. 3,170,786 and 3,427,010; and British Pat. No. 1,057,049).

These shell tubes are expensive to install and are worn quickly because of the high thermal and mechanical stresses they are subjected to. They are also flow obstacles in the furnace.

High reaction gas speed is used in the production of ball iron (Luppen) in rotary furnaces. Reaction gases including oxygen or air are blown into the discharge end of the furnace with such speed that they penetrate the ball zone (Lupp-Zone) and in concentrated form impinge on the charge in the reduction zone. The charge is strongly heated in those areas of the charge where the gases impinge.

It is also known to blow air, oxygen-enriched air or oxygen into the kiln from its discharge end at a velocity of 20 - 100 m/sec. and under such pressure and at such a rate that a superatmospheric pressure is maintained in the rotary kiln throughout its length. The gases, again, locally concentrate heat. Additional gas is drawn by injector (venturi) action into the rotary kiln at its upper end or is blown in at a low velocity through an additional pipe.

All of the prior systems as described above have proved to be unsuitable for one reason or another.

OBJECT OF THE INVENTION

The object of the present invention is to overcome the disadvantages which result if shell tubes are used for the injection of oxygen-containing gases in rotary furnaces to produce sponge iron from iron oxide.

SUMMARY OF THE INVENTION

This object can be achieved according to our invention by injecting oxygen-containing gases into one end of a rotary furnace with high speed, in the same direction as the flow of the furnace gases and in a direction substantially parallel to the longitudinal axis of the rotary furnace.

Our process is particularly advantageous for the operation of rotary furnaces in which the solid charge and the furnace gases move in opposite directions (counterflow). The oxygen-containing gases are then injected into the discharging end of the rotary furnace. The process can also be used, however, for the operation of a rotary furnace in which the solid charge and the furnace gases move in the same direction (uniflow). However, the charge should then be heated before the introduction into the furnace or an auxiliary burner should be used which quickly brings the charge to the ignition temperature. In this case the oxygen-containing gases are also blown into the furnace through the charging end thereof.

The stream of oxygen-containing gases injected into the rotary furnace is maintained in accordance with our invention, over almost the whole length of the furnace and at least half the length thereof as a compact, concentrated stream but is absorbed or dissipated continuously in the individual furnace zones in relation to the oxygen consumption in the zones. Also, the total amount of injected oxygen-containing gases is adjusted to correspond to the actual consumption.

According to a preferred embodiment of our invention, the oxygen-containing gases are injected with a speed of at least 50 m/sec., preferably at least 100 m/sec. An excellent pentration of the rotary furnace is achieved with such speeds. The speed of the oxygen-containing gases is measured at the outlet of the injection tube for the gases.

According to another preferred embodiment of our invention, a slight over-pressure (superatmospheric pressure) is maintained in the closed head portion at the oxygen-injection end of the rotary furnace. This over-pressure is reduced, at least up to or beyond the center of the length of the furnace, in the direction of oxygen injection, preferably within a quarter of the length of the furnace. By this measure, undesired oxygen from ambient air will not be sucked into the reduction zones of the furnace and the content of oxygen in the active gas mixtures in the furnace can be controlled.

The over-pressure in the closed head portion can be up to 10 mm water column, preferably up to 5 mm water column.

According to another preferred embodiment of our invention, the oxygen-containing gases are injected along the center of the charge-free portions of the cross-section (free cross section) of the rotary furnace. By applying this rule for locating the position of the oxygen-containing gas stream from the injection inlet and into the furnace and substantially parallel to its axis a very satisfactory projecting distance of the oxygen-containing gas stream over the surface of the moving charge is obtained and local overheating and premature mixing of oxygen-containing gases and fuel gases can be avoided. The oxygen-containing gas, e.g., air or oxygen-enriched air, thus never impinges directly upon the charge.

According to another preferred embodiment of our invention, a part of the oxygen-containing gases can be injected into the furnace by means of nozzle blocks or bricks mounted in the wall of the rotary furnace in the area of the end thereof for the introduction of the charge. Such nozzle blocks are inserted into the wall of the furnace and form part of the refractory lining thereof, and their outlets end in the plane of the inner surface of the refractory lining or project only a small distance inwardly beyond this plane. The nozzle blocks, with their passages substantially flush with the inner wall, can be made of metallic or ceramic materials. The oxygen-containing gases can be introduced into the rotary furnace in such a manner that they only are introduced into the charge, only are introduced into the gas space above the charge, or simultaneously are introduced into the charge and the gas space over the charge. Preferably the nozzle blocks extend over a quarter of the length of the furnace.

With such arrangements it is possible to achieve a very satisfactory distribution of the oxygen-containing gases supplied to the rotary furnace and a shorter heating zone, also with long rotary furnaces. The heating zone can also be operated as an oxidizing zone, and it is not necessary to pass a substantial excess of oxygen-containing gases through the reducing zone.

Another embodiment of our invention consists in injecting the oxygen-containing gases by means of nozzle blocks mounted in an area of the wall of the rotary furnace extending from the end of the furnace up to one quarter of the length of the furnace. Particularly satisfactory throughput performances are achieved thereby.

Between 20 and 60 percent of the oxygen-containing gases required by the furnace is introduced by means of nozzle blocks. This measure leads to very satisfactory operation conditions, since a particularly advantageous distribution of injected oxygen-containing gases in the rotary furnace is possible. Good results can also be obtained with a smaller total gas volume.

According to another feature of our invention the oxygen-containing gas is oxygen-rich air or oxygen. Reduction can be achieved with smaller gas volumes and the heating of large quantities of ballast nitrogen is reduced or avoided.

An important contribution of our invention to the art is that a substantially less expensive injection system for the oxygen-containing gases can be built or installed, and that the operating economy and the flow conditions in the rotary furnace are improved.

DESCRIPTION OF THE DRAWING

The above and other objects, features and advantages of the present invention will become more readily apparent from the following description, reference being made to the accompanying drawing in which:

FIG. 1 is a longitudinal cross-section of a rotary furnace; and

FIG. 2 is a transverse cross-section of the rotary furnace along the line I — I of FIG. 1.

SPECIFIC DESCRIPTION

In FIG. 1, an inclined rotary furnace 1 is suspended on curved rails 2 for rotary movement. Curved rails 2 are supported by rail supports 3. The rotary furnace 1 is rotated by the driving mechanism 4 consisting of a motor and a ring gear.

Oxygen-containing gases 21 are injected through the inlet 5 with high speed. Nozzle blocks 6 are mounted in the wall of the rotary furnace 1 in the area of the charging end of the furnace 1, in which the charge 20 consisting of iron-oxide, solid carbon containing reducing agent and dolomite is charged into furnace 1. Air 22 is injected with comparatively slow speed through the nozzle blocks 6 into the gaseous environment of the furnace 1 and/or the charge 20. The air is supplied by the blower 23 into pipe 24 and from there distributed by valves 25 into supply-conduit 26 for the nozzle blocks 6. The solid charge 20 travels downwardly in a counterflow to the injected gas 21.

The head 40 is under a pressure of up to 10 mm $H_2O$ to exclude extraneous air. The reacted charge containing the sponge iron is recovered at 43. The waste gas leaves the head 42 at 44.

FIG. 2 shows a transverse cross-section of the gas inlet portion with inlet 5 for oxygen-containing gases 21 and the charge 20. The inlet 5 is placed in the center area or the charge-free portion of the cross-section above the center line 1' to make possible optimum gas flow conditions in the rotary furnace 1.

SPECIFIC EXAMPLES

EXAMPLE 1

12,400 kg/h iron oxide with 67.5 percent iron content and 11,000 kg/h carbonaceous reducing agent and 600 kg/h dolomite are introduced into the charging end of a substantially cylindrical elongated rotary furnace having a length of 50 m and an internal diameter of 3.14 m. This charge is displaced towards the discharging end of the furnace with a speed of 0.35 cm/sec and heated. The waste gas has a temperature of 1,200°C and consists of 20,000 $Nm^3/h$ with 23% $CO_2$, 1% CO, 0.5% $O_2$, 0.5% $H_2$ and 75% $N_2$.

The temperature of the charge is adjusted to just below its softening- and melting-points by regulating such paramaters of the furnace gas as its speed, its amount per time unit, its temperature, its direction in relation to the longitudinal axis of the furnace and the surface of the charge.

A stream of air is injected in an amount of 15,300 $Nm^3/h$ and with a speed of 75 m/sec through an inlet in the discharging end of the furnace in a direction substantially parallel with the longitudinal axis of the furnace and approximately 1.1 m above the surface of the charge. The speed of this stream is sufficient to carry it over at least a major part of the length of the furnace, although it gradually dissipates and is absorbed during its travel along the length of the furnace. 8,460 kg/h sponge iron and 3,660 kg/h surplus coal can be collected at the discharging end.

The following data for the process were obtained: weight ratio for sponge iron and iron-oxide charge: 1.466; and production speed: 141 kg sponge iron per minute.

EXAMPLE 2

A slight over-pressure of 5 mm water column is maintained in the closed head portion of the rotary furnace of EXAMPLE 1. This portion is located at the injection end of the furnace. The pressure is reduced gradually from the center of the furnace towards the charging end of the furnace. The over-pressure makes possible even better flow conditions and gas mixture ratios. Only negligible traces of undesirable gas components are sucked into the reduction areas of the charge.

The following data for the process were obtained: weight ratio for sponge iron and iron-oxide charge: 1.466; and production speed: 141 kg sponge iron per minute.

EXAMPLE 3

20 percent of the air (3,830 Nm$^3$/h) in EXAMPLE 1 is injected into the furnace by means of 40 to 100 nozzle blocks partly forming the wall of the furnace in the area of the charging end. These blocks are confined to an area of one quarter of the length of the furnace. The introduction of the air through the nozzle blocks causes a quicker heating of the charge to the reproduction temperature and therefore a higher throughput.

14,900 kg/h iron-oxide, 13,200 kg/h carbonaceous reducing agent and 720 kg/h dolomite are introduced into the charging end of the kiln. The amount of the waste gas is 24,000 Nm$^3$/h. 18,400 Nm$^3$/h air are injected into the discharge end of the kiln. 10,150 kg/h sponge iron and 4,400 kg/h surplus-coal are collected at the discharge end. The weight-ratio for sponge iron and iron-oxide charge is 1.466 and the production speed is 169 kg sponge iron per minute.

We claim:

1. A process for producing sponge iron in an elongated rotary furnace having a charging end and a discharging end, said process comprising the steps of:
   introducing iron oxide and substantially all of the solid carbonaceous reducing agent required to reduce said iron oxide into said furnace at said charging end to form a solid charge in said furnace;
   displacing said charge in said furnace from said charging end to said discharging end while reacting it with said solid carbonaceous reducing agent between said ends;
   heating said charge between said ends to a temperature sufficient to sustain reduction of the iron oxide but below the melting point of the charge by combustion of part of said solid carbonaceous reducing agent to produce furnace gases traversing said furnace substantially from one of said ends to the other of said ends; and
   injecting a stream of oxygen-containing gas into said furnace at said one end cocurrently to the flow of the kiln atmosphere substantially parallel to the axis of the furnace with a velocity of at least 50 m/sec and sufficient that no impingement upon said charge occurs and said stream maintains its identity over at least a major portion of the length of said furnace whereby the oxygen of said stream is consumed continuously in the successive furnace zones.

2. The process defined in claim 1 further comprising the step of forming said oxygen-containing gas by enriching air with oxygen.

3. The process defined in claim 1 wherein said stream is injected with a speed of at least 100 m/sec.

4. The process defined in claim 1 wherein said furnace has a closed head portion at said one end thereof, further comprising the steps of maintaining a slight superatmospheric pressure in said closed head portion; and gradually reducing said superatmospheric pressure over a part of the length of said furnace in the direction of flow of said stream.

5. The process defined in claim 4 wherein said part of said furnace is at most one-half of the length thereof.

6. The process defined in claim 4 wherein said part of said furnace is one-quarter of the length thereof.

7. The process defined in claim 4 wherein said superatmospheric pressure in said closed head portion is at most 10 mm water column.

8. The process defined in claim 4 wherein said superatmospheric pressure in said closed head portion is at most 5 mm water column.

9. The process defined in claim 1 wherein said furnace has a free cross-section with a center and said stream is injected substantially at the center of the free cross section.

10. The process defined in claim 1 wherein a part of the oxygen requirement of the furnace is injected as a gas through nozzle blocks forming the furnace wall in the area of said charging end, said nozzle blocks having passages traversed by gas substantially flush with the surfaces of the blocks defining said wall.

11. The process defined in claim 10 wherein said part of the oxygen is introduced through said nozzle blocks over approximately one quarter of the length of said furnace.

12. The process defined in claim 10 wherein between 20 and 60 percent of said oxygen requirement is injected into said furnace through said nozzle blocks.

* * * * *